Patented Dec. 2, 1952

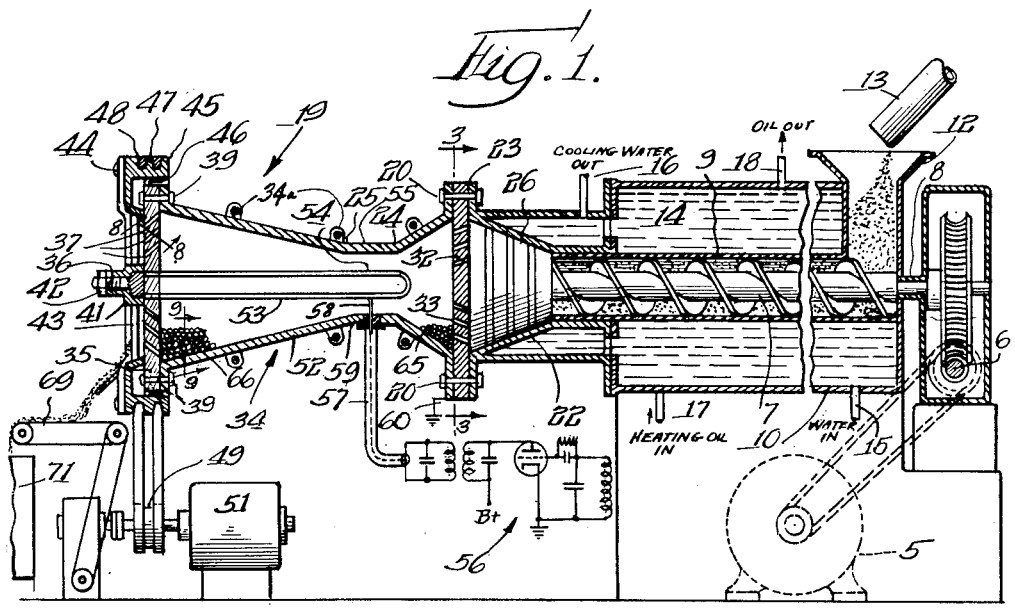

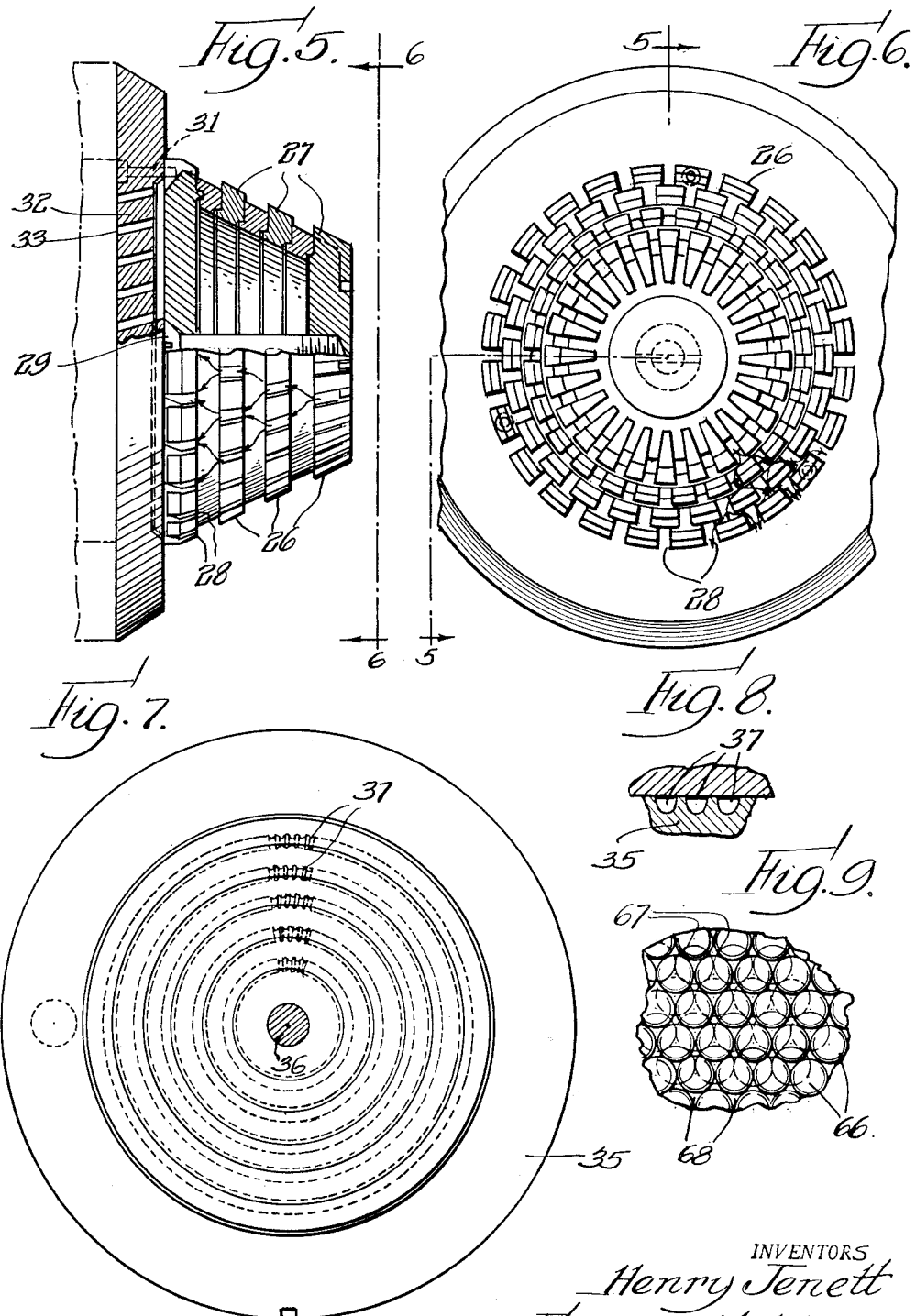

2,620,172

UNITED STATES PATENT OFFICE 2,620,172

DISPERSION METHOD AND APPARATUS

Henry Jenett, Montclair, N. J., and Eugene Mittelmann, Chicago, Ill.; Caroline Louise Maria Jenett, executrix of said Henry Jenett, deceased, assignors, by direct and mesne assignments, to Selectronic Corporation, a corporation of New Jersey Application March 18, 1949, Serial No. 82,237

14 Claims. (Cl. 259—4)

The present invention relates to a method of and apparatus for dispersing various substances and particularly to the dispersing of plastic materials. It further relates to such a method and apparatus in which the dispersing is promoted by heating by means of high frequency electric currents by a novel method and means.

It is now well known in the art to employ diversified methods and apparatus whenever two or more substances are to be intimately and uniformly admixed with each other to form a more or less homogeneous product. Despite the numerous methods, which call for a variety of equipment, both the steps employed and the apparatus used are commonly referred to by the term "compounding." Although this may be an apt term under some circumstances, in the case of plastics the word "compounding" is generally misleading because such term properly applies to chemical processes only, where compounds are formed as a result of chemical reaction. This is totally different from the results achieved by the purely physical admixtures usually produced in the art of making plastics.

Moreover, even though in some instances the mixtures produced by these physical processes are very intimate indeed, often in the nature of solutions—as in the case of cellulose esters or synthetic resins and their respective plasticizers—the term "compounding" is still misleading. For example, the application of the term "compounding" to rubber, in which industry it appears to have been first used to describe the purely physical step of preparing the stock mixtures, is erroneous, even though, during the vulcanization of the stock which has been "compounded" by kneading or milling, a chemical reaction between the rubber and the sulfur does take place. Since vulcanization occurs subsequent to the process of fabricating articles from rubber stock, the term "compounding" is obviously misapplied when used to describe the preparation of the stock itself.

In order to differentiate between chemical compounding and the results produced by the present invention, whenever reference is made to physical mixtures of two or more substances, no matter how intimate and uniform their association may be, they will hereinafter be referred to as "dispersions." It is also to be understood that, while the present invention will be described primarily with reference to "dispersions" for the production of plastics, it is nevertheless fully applicable to chemical compounding wherever mixing, blending, dispersing, aerating, catalyzation, or heat equalization are of importance; the invention will in fact offer unlimited advantages to the chemical compounding art, as will become obvious from the following description.

Considering now more particularly the production of plastics, it is well known to those versed in the art that while organic vehicles—such as solid solutions of cellulose esters or ethers, resins, polymers, and the like in plasticizers, oils, or similar media—can be readily produced by simple kneading, preferably at elevated temperatures, the proper incorporation of such modifying agents as fillers, pigments, or other inert matter, can only be accomplished by shearing or tangential stress, resulting from the application of forces, which tend to cause contiguous parts of a mass to slide relatively to each other in a direction parallel to their planes of contact.

It is for the above noted reasons that plastics are usually made in a series of steps, generally in at least two steps, i. e., the preparation of the so-called vehicle by kneading in a dough-mixer type vessel, and the incorporation of pigments, fillers and other modifying agents by friction on open rolls. Although both operations develop heat in the mass, additional heat is usually introduced by conduction or convection, in order to aid in the dispersing of the various ingredients.

Such multiple step processes have the disadvantage of loss of heat in the mass between the various steps, which seldom follow immediately one upon another. There is also danger of overheating the mass, with simultaneous deterioration due to excessive absorption of oxygen while the mass is being constantly "aerated," particularly on open rolls. Also there is frequently a loss of inhibitors—generally added to the mass with the object of preventing the decomposition of the finished plastic—thereby leaving no safety margin against overheating or decomposition through other causes when the plastic is being manipulated by the converter. In addition there ensues contamination coincidental with the transfer of the mass from one type of equipment to the other, or with storage between the various steps.

Above all, the greatest disadvantage of conventional methods is insufficient and sporadic attrition, which occurs in mixers only at points where the kneading arms pass the walls of the trough, or on rolls where two rolls meet for a very brief period of time at their peripheral lines of contact, which form something more than mathematical lines. Thus, the type of equipment and processes used heretofore in the plastics industry cannot accomplish much more than a mixing or blending of the ingredients which in no way approaches the complete dispersion accomplished by the present invention.

As was mentioned previously it is generally necessary to add heat during the dispersion operation. Heretofore this has generally been done by conduction or convection. Water jackets were provided in the sides of the dispensing apparatus for the circulation of a liquid heat conducting medium or conduits were placed through the dispersing apparatus to carry a liquid heat conducting medium to heat the materials being dispersed. Heating could also be accomplished by passing hot gases through jackets or conduits or by blowing them against the surface of the material being dispersed. All of these methods had the undesirable result of adding too much heat in some parts of the dispersion and too little heat in other parts. In an attempt to produce uniform heating we performed experiments using high frequency electric currents with modifications of conventional electrode systems. It was found that if the entire mixture was to be heated uniformly the electrodes had to be separated a considerable distance and insulation had to be provided throughout the interior of the dispersion apparatus and two or more insulated portions had to be provided for bringing in the electrode leads. The high pressure developed within the dispersion chamber often cracked the large amount of insulation needed and rendered the apparatus inoperable.

It is accordingly an object of the present invention to provide a method of dispersing materials, so that the ingredients of a given formula form a distinct substance having maximum homogeneity, with even the minutest aggregate containing the same definite ingredients united in the same proportions by weight, and with substantially the same internal physical arrangement.

Another object of the present invention is the provision of a method whereby the material being dispersed is heated uniformly throughout its mass.

Another object of the present invention is the provision of a method of dispersing materials wherein the particles have such intimacy therebetween, as to perhaps be best described as resulting in coalescence approaching the ultimate basic aggregate.

Another object of the present invention is the provision of a method of allowing organic substances with one another or organic with inorganic substances wherein a kneading-shearing action is imparted to the minutest particles of the entire mass to produce maximum homogeneity, the basic aggregates containing the same definite ingredients united in substantially the same proportions by weight and in substantially identical internal physical arrangement.

Another object of the present invention is the provision of apparatus for the dispersion of materials wherein the particles are united in substantially the same proportions by weight with the same ingredients and have substantially identical internal physical arrangement.

Another object of the present invention is the provision of apparatus for the dispersion of materials wherein every part of the entire mass is subjected to the same sequence of temperature and pressure changes so as to produce a substance wherein the minutest basic aggregate contain the identical ingredients in substantially the same proportions by weight and each possess substantially the same internal physical arrangement.

Another object of the present invention is the provision of apparatus for the uniform heating of the material, such apparatus being constructed of metal to withstand the high internal pressure developed.

Another object of the invention is the provision of apparatus for the dispersion of materials to produce a uniform substance, wherein the mass itself moves against stationary dispersing elements so that internal frictional heat is uniformly distributed thereby preventing localized overheating and consequent deterioration.

A further object of the present invention is the provision of apparatus for the dispersion of materials, wherein the maximum surface area of stationary elements is exposed to the mass so as to disperse the ingredients in such manner that the minutest basic aggregate containing the identical ingredients in substantially the same proportion by weight and internal physical arrangement.

Still further objects of the present invention will become readily apparent to those skilled in the art by reference to the accompanying drawings wherein:

Figure 1 is an elevational view partly in cross-section and partly schematic of an apparatus constructed in accordance with the present invention for the dispersion of materials such as plastics, including a schematic diagram of the associated power oscillator.

Figure 2 is a plan view of the discharge end of the apparatus of the present invention omitting the conveyor apparatus.

Figure 3 is a sectional view taken on the line 3—3 of Figure 1.

Figure 4 is a schematic diagram representing the electrically equivalent circuit of the dispersion head.

Figure 5 is a sectional view taken on the line 5—5 of Figure 6.

Figure 6 is a fragmentary elevational view taken on the line 6—6 of Figure 5.

Figure 7 is a partially sectional view of the end plate of the dispersion head.

Figure 8 is a sectional view along the line 8—8 of Figure 1.

Figure 9 is a fragmentary sectional view along the line 9—9 of Figure 1.

Referring now to the drawings in detail the dispersing apparatus of the present invention, as shown in Figure 1, comprises a power drive unit including an electric motor 5, which through suitable reduction gearing 6, rotates a feed screw 7. This feed screw passes through a suitable packing gland 8 into a tubular metal chamber or conduit 9. The ingredients of the plastic material are dumped into the hopper 12 from a suitable conveying receptacle, pipe, or the like 13 from whence they pass into the chamber 9. The cylinder-like member 10 is provided with interior passageways such as shown at 14 in Figure 1 for example, for the passage of a cooling agent such as water, which enters through inlet conduit 15 and exhausts from a similar outlet conduit 16, and similar passageways (not shown) for the flow of a heating agent, such as steam or hot oil, which enters through inlet conduit 17 and exhausts from an outlet conduit 18. By the utilization of a cooling and heating agent, the walls of the tubular chamber 9, and hence the material moved along by the screw 7, are maintained at a substantially uniform preselected temperature since the flow of both the cooling and heating agent is thermostatically controlled.

Detachably secured to the cylinder-like member 10 is a mixing, heating and dispersing head 19 constituting the most essential part of the apparatus of the present invention. By reference to Figure 1, it will be noted that this head 19 comprises a metallic member rigidly secured to the member 10 by a suitable means such as nuts and bolts 20 capable of withstanding the pressure to which the head 19 is subjected while at the same time enabling the head to be readily removed for purposes as hereinafter mentioned. The portion of the head 19 adjacent the cylinder-like member 10 is also provided with the aforementioned passageways 14 which communicate with those within the member 10 so that circulation of the cooling and heating agents extend at least for a portion of the length of the head 19.

The interior of the head 19 adjacent the end of the screw 7 is tapered at a sharply receding angle away from the screw end to form a cone-like opening 22 to a point 23 of abrupt increase in diameter. From effectively this point the taper is reversed to a point 24 where the head 19 assumes a cylindric configuration to the point 25 where a receding angle is again encountered which continues gradually to the opposite end of the head 19. Positioned within the cone-shaped opening 22 are a plurality of interlocking mixing plates 26 which as more clearly shown in Figures 5 and 6 have a peripheral edge 27 corresponding to the angle of taper of the cone-like opening 22 and laterally spaced peripheral slots of grooves 28 in alternate plates of enlarged diameter. These plates are secured together in any suitable manner such as by means of a screw 29, and in assembling such plates 26 prior to positioning in the head 19 the slots 28 of alternate plates are staggered so that material flowing through must necessarily follow a tortuous path along the peripheral grooves 28 and around the tapered periphery of the alternate spacer plates of slightly smaller diameter and between the wall of the cone-like opening 22.

Spaced slightly from the largest diameter mixing plate 26 and attached thereto as by screws 31 is a composite strainer plate 32 consisting of a number of concentric tapered rings nesting in each other and provided in their outer periphery with the grooves 33.

The remainder of the head 19 comprises a combination heater-disperser 34. This portion of the head 19 consists of two similar longitudinal halves having a plurality of radial flanges 34a through which bolts may be passed to secure the halves together and is fixed to the strainer plate 32 and the portion of the head adjacent the cylinder-like member 10 by means of the previously mentioned nuts and bolts 20. The combination heater-disperser 34 is terminated by a composite metallic strainer plate 35 having a projecting stud 36 and providing a plurality of angularly extending lateral openings or orifices 37, as shown more clearly in Figures 7 and 8 with the configuration of the openings 37 depending upon the shape of the final product desired.

It will be noted that the strainer plate 35 is fastened to the heater and disperser member 34 by means of nuts and bolts 39. Journaled upon a suitable bearing 41 carried by the stud 36 and held on the latter by a lock nut 42 is a four-bladed cutting knife 43 for cutting the dispersed material as it is extruded through the orifices 37 in the end strainer plate 35. It may be seen that the cutting knife 43 is secured in a suitable manner such as by screws 44 to an annular ring 45 which is journaled for rotation upon roller bearings or the like 46 carried at the extremity of the head 19. This ring 45 is provided with peripheral grooves 47 engaged by a suitable belt or the like 48, which extends from a pulley 49 rotated by a power source such as electric motor 51 (Figs. 1 and 2), so that upon energization of the motor 51 the ring 45 together with the cutting knife 43 is rotated with the blades of the knife being in close proximity to the surface of the end strainer plate 35 so as to cut the excluded plastic material into small pellets.

In order that the plastic material may be properly dispersed, it is necessary that the material should be at a uniform controlled temperature throughout its entire mass during the dispersion. External heating such as from the chambers 14 does not provide sufficiently uniform heating for this step. High frequency electrical heating by means of electrodes is unsatisfactory in that large amounts of insulation are required and the insulation often cracks under the internal pressure developed. Therefore, the heater-disperser 34 is constructed of a coaxial line consisting of an external conductor 52 and an internal conductor 53. Any coaxial line system may be shortened physically but remain unchanged electrically by adding a capacity at the end of the line. The outer conductor 52 together with the inner cylinder conductor 53 and the terminating plate 35 forms such a system shortened by a capacity. The capacity is located mainly between the end portion 54 of the inner conductor 53 and the indented portion 55 of the outer line. The inner and outer conductors 52 and 53 are terminated and short circuited by the aforementioned end strainer plate 35. The heater-disperser is thus equivalent to a resonant circuit being electrically equivalent to a short circuited line one-quarter the wave length of the oscillations generated by the exciting high frequency generator 56 which may be a power oscillator of any desired type preferably operating at greater than one hundred megacycles per second and is detachably connected to the heater-disperser by means of the coaxial cable 57. The inner conductor of the coaxial cable 57 is connected by means of a connecting bolt 58 to the inner conductor 54 of the heater-disperser 34, and the outer conductor of the coaxial cable 57 is connected to the outer conductor 52 of the heater disperser 34. The connections are made at such a position as to provide a match for the optimum transfer of energy from the oscillator to the heater-disperser. As the heater-disperser 34 is a coaxial line it must obviously be a conductor and the structure thus can be made entirely of steel to withstand the high internal pressures with the single exception of the ceramic disk insulator 59 at the connecting point to the coaxial cable 57. An electrical circuit equivalent to the heater-disperser 34 is shown in Figure 4 in which the inductances 61 and 62 represent the portions of the outer conductor from the strainer plate 32 to the point 25 where the taper becomes divergent. Capacity 63 represents the distributed capacity of the line appearing mostly between the indented portion 55 of the outer conductor and the end portion 54 of the inner conductor 53. The inductance 64 represents the residual inductance of the line. The heater-disperser may be grounded as at 60 adjacent the inlet strainer plate 32 so that no high potential will appear on the outside of this structure to cause danger to an operator or to cause a spark which could cause a completely destructive fire or explosion if drawn in the proximity of the highly flammable plastic materials being mixed.

The entire interior of the heater disperser 34 is filled with relatively tightly packed small elements 65 and 66 so shaped as to expose a maximum surface area to a mass of plastic material and are so placed in relation to each other that the mass undergoes constant and recurrent change in volume, in direction of flow, and in speed of travel by passage alternately through a multiplicity of fine film producing interstices 67 and pool-forming interstices 68.

For this purpose it has been found that these small elements 65 and 66 may preferably be spheres, as shown particularly in Figure 9, of a uniformly small diameter of ⅛ to ½ inch or more, depending upon the nature and density of the materials to be dispersed, the fineness of dispersion required, the desirability or otherwise of reducing the particle size of one or more of the ingredients beyond their commercial grade. It is generally desirable that the spheres 65 should be smaller than the spheres 66 for best dispersion. It is also preferable that these small spheres 65 and 66 have a smooth polished surface and they must be capable of withstanding the pressure exerted. These spheres 65 and 66 are desirably of glass or ceramic.

The method of dispersing in accordance with the present invention and the particular apparatus above described and constituting one type for carrying out such method is as follows: The various ingredients for a desired plastic dispersion are fed in the proper proportions into the hopper 12 whence they gravitate into the feeding chamber 9.

The screw 7, which is rotated by the power drive 5, moves the mass along the chamber 9 at a uniform speed. At the same time the mass receives its initial heating at a controlled temperature, by the thermostatically controlled cooling and heating media circulating through the interior of the cylinder-like member 10. Since the screw 7 exerts a considerably high pressure on the mass, it is then forced while at a desired temperature into the head 19 where the mass being commingled first contacts the stationary mixing plates 26 formed into a cone. As these plates have a solid center the only passage the mass can take is through the staggered peripheral grooves 28, as shown by the arrows in Figures 5 and 6, which thus initially disperses the mass by requiring it to flow through a plurality of tortuous paths in close proximity to the heated interior wall of the end of the head 19, with attendant mixing of the ingredients to a much greater extent than possible in the mass as it passed through the chamber 9.

After passage of the mass through the various tortuous paths formed by the grooves 28, it is again more or less merged at the strainer plate 32 where it is forced through the angularly extending openings 33 formed by the composite strainer plate 32 into the interior of the heater-disperser 34 where the mass contacts the tightly packed stationary spheres 65. The uninterrupted flow of the material against the many small spheres produces a maximum kneading-shearing action on the material; the constant and regularly recurring change of pressure, as the mass flows from extremely fine interstices 67 existing between contiguous spheres into the larger interstices 68, sets up a "pulsating" action which results in complete dispersion of the material, so that even the minutest basic aggregate contains substantially the same definite ingredients united in the same proportions by weight and substantially the same internal physical arrangement.

During dispersion of the material in passing through the dispersing head 19, the individual particles are subjected to a uniform temperature no matter how great the mass, because of the dielectric heating, in the capacitive field of the coaxial line structure which comprises the heater-disperser 34. The temperature during dispersion is maintained uniformly constant throughout the mass and is accurately controlled. This could not be obtained by any manner other than dielectric heating and, as has been previously described, dielectric heating between electrodes is unsatisfactory due to the cracking of insulation under pressure. Consequently, this heater-disperser 34 is the only practical means of maintaining the necessary uniform temperature. Following dispersion, the material is forced out of the end strainer plate 35 through the plurality of angularly disposed openings 37 where it is sliced off by the rotating knife blades 43 to form small pellets which may then drop onto a conveyor 69 to be carried to a suitable shipping or storing container 71. Due to the peripheral taper of the mixing plates 26 and the composite plates 32 and 35 all of the parts can be readily removed from the mixing head 19 for cleaning when desired. When there is a demand for frequent recurring quantities of the same material and color it is unnecessary to clean the head 19 in its entirety after each run. Instead, the cutting knife 43 and annular ring 45 are removed by loosening the lock nut 42. A new batch of material is then introduced into the chamber 9.

Pressure exerted by the screw 7 on the mass of the new batch then forces the entire dispersing head 19 away from the cylinder-like member 10 and feed screw 7 whereupon operation of the apparatus is temporarily discontinued. The composite strainer plate 32 together with the plates 26 and end strainer plate 35 are then readily broken away from each end of the heater-disperser, leaving the latter together with the small spheres 65 and 66 as a solid mass for replacement when a run of the same material and color is then desired, or the halves of the heater-disperser may be separated for cleaning and repacked with a new quantity of small spheres 65 and 66. At this time or before it is necessary to detach the coaxial cable 57 from the connecting bolt 58 and outer conductor 52 of the heater-disperser.

The small screws 31 are then removed from the strainer plate 32 allowing it to be removed from engagement with the several tapered plates 26 whereupon the screw 29 is next removed. Since the plates 26 are then held together only by the solidified material within their respective peripheral grooves, these plates are quickly separated by means of a punch or the like. When the plates are separated the individual peripheral grooves 28 can be readily cleaned for reassembly. The same applies to the strainer plates 32 and 35, the composite parts of which are nested together to form the respective tapered openings 33 and 37. This tapered engagement allows the parts to be readily separated in a punch press or the like, wherein the openings 33 and 37 then become merely peripheral grooves, identical to the grooves 28 in the plates 26, enabling cleaning of the strainer plates 32 and 35 with facility. After cleaning, the plates 26 and the strainer plate 32 are reassembled and inserted in their former position in the head 19. A new heater-disperser 34 containing spheres 65 and 66 held in position by the material of the ensuing run is affixed thereto by means of nuts and bolts 20. The cleaned composite end strainer plate 35 is placed in position and fastened by means of nuts and bolts 39. The knife 43 and annular ring 45 are then mounted on the stud 36 and held in place by the lock nut 42. The heater-disperser 34 that was removed is then stored until another run of the same material is to be made.

It can thus be seen that the method of dispersion in accordance with the present invention consists in intimately dispersing a plurality of materials by forming a preliminary mixture and then breaking the mixture into a multiplicity of small pools connected to each other only by fine films, and alternately forcing the pools into films and expanding the films into pools while constantly heating the materials by radio frequency electric currents until uniform dispersion is obtained and wherein optimum coalescence of the ingredients results with formation of the basic aggregate containing the same definite ingredients united in substantially the same proportions by weight and having the same internal physical arrangement.

It is also to be understood that while dielectric spheres have been shown and described as being the preferable elements employed in the dispersing head, the size and shape of these small elements may vary depending upon the nature and density of the materials to be dispersed, the fineness of dispersion required and the desirability of reducing the particle size of one or more ingredients beyond their commercial grade. For example, if the mass be very mobile in character or if it be processed at temperatures at which it becomes liquid, the spheres may be even smaller than one-eighth of an inch in diameter, while on the other hand if the mass contains some bulky ingredient which can not or should not be reduced in the process, the spheres would be of a larger diameter to avoid the straining out of these bulky ingredients.

Just as the spheres may be varied in size according to the fineness of dispersion desired so too can the surface of these small bodies be varied. Where frequent changes between compositions or colors is called for, or where cleaning offers some problem due to the adhesive nature of the composition, a mirror-like finish is most desirable. However, the surface may be varied by giving the spheres a dull, sandblasted or even an etched finish, or they may be covered with more or less deeply engraved lines, grooves, spirals and the like to facilitate the flow of the mass, or they may be engraved in relief or faceted to multiply the number of "pools" in a given element. Moreover, the spheres may also be replaced by other geometrical bodies, such as ellipsoids, cubes, pyramids, etc., which, however, require careful stacking in the dispersing chamber and in some instances, sufficient scoring or grooving of the surface in order to maintain an even and uninterrupted flow of the mass.

The invention is hereby claimed as follows:

1. The method of intimately dispersing a plurality of materials which comprises forming a preliminary mixture, breaking the mixture into a multiplicity of small pools connected to each other only by fine films, and heating the mixture with high frequency electric currents while continuously kneading-shearing the material by alternately forcing the pools into films and expanding the films into pools until uniform dispersion is obtained with the formation of basic aggregates containing the materials united in substantially the same proportions by weight and having substantially the same internal physical arrangement.

2. The method of intimately dispersing a plurality of materials which comprises forming a preliminary mixture, breaking the mixture into a multiplicity of small pools connected to each other only by fine films, and continuously kneading-shearing the material by alternately forcing the pools into films under increased pressure and expanding the films into pools until uniform dispersion is obtained while maintaining uniform heat throughout the mass, by the physical action and with high frequency electric currents to form basic aggregates containing the materials united in substantially the same proportions by weight and having substantially the same internal physical arrangement.

3. The method of intimately dispersing a plurality of materials which comprises forming a preliminary plastic mixture by forcing the material under pressure greater than atmospheric through a plurality of attenuated streams, and heating the mixture with high frequency electric currents concurrent with forcing the mixture under pressure greater than atmospheric through a bed of immobile elements all of which touch each other to form a honeycomb of pools and films, the mixture being alternately forced into films by the pressure and expanded into pools to impart a kneading-shearing action thereto until uniform dispersion of the materials into basic aggregates containing the same proportions by weight and substantially the same internal physical arrangements is obtained.

4. The method of intimately dispersing a plurality of materials which comprises forming a preliminary plastic mixture, forcing the mixture under pressure greater than atmospheric through a bed of elements all of which touch each other to form a honeycomb of pools and films, the mixture being alternately forced into films by the pressure and expanded into pools to impart a kneading-shearing action thereto, and subjecting the mass to high frequency electrical energy to cause heating uniformly throughout the mass, to obtain uniform dispersion of the materials into basic aggregates containing substantially the same proportions by weight and internal physical arrangement.

5. The method of dispersing materials which comprises commingling the ingredients by forcing the latter under pressure greater than atmospheric through a plurality of attenuated streams to form a mass, forcing the mass under pressure greater than atmospheric over a multiplicity of small stationary surfaces and into a plurality of small pools to create a pulsating kneading-shearing of the mass, and simultaneously subjecting the mass to a high frequency electrical current passing between the conductors of an electric line to uniformly heat the entire mass to an accurately controllable temperature, to effect dispersion of the ingredients uniformly throughout the mass whereby the finished product contains basic aggregates of the ingredients united in substantially the same proportions by weight and internal physical arrangement.

6. The method of dispersing materials which comprises subjecting the ingredients of the material while at a controlled temperature and under pressure greater than atmosphere to initial mixing by flowing the mass through a multiplicity of tortuous paths in attenuated streams, dispersing the initially mixed material by continuously forcing the mass under pressure greater than atmospheric recurrently over the surface of a plurality of small stationary bodies and into a multiplicity of minute pools to cause a pulsating kneading-shearing of the material, and uniformly heating the mass by dielectric loss in a coaxial line during pulsating, to effect dispersion of the ingredients whereby the finished product contains basic aggregates of the ingredients united in substantially the same proportions by weight and the same internal physical arrangement.

7. An apparatus for dispersing material comprising a feeding chamber into which the ingredients of a desired product are introduced to form a mass, means for applying pressure to the mass within said feeding chamber to continuously force said mass in a desired direction, means providing a plurality of small tortuous attenuated paths at the end of said chamber through which said mass is formed to effect preliminary mixing of the ingredients throughout the mass, a multiplicity of small stationary dispersing elements, and means for retaining said elements adjacent said tortuous path providing means and disposed in the path of flow of the preliminary mixed mass to cause the latter to pass continuously in fine films over the recurrent surfaces of said dispersing members and into interstices formed therebetween with an ensuing pulsation and kneading-shearing of the ingredients of the mass to effect uniform dispersion thereof.

8. An apparatus for dispersing material comprising a heater-disperser, said heater-disperser comprising a coaxial line having inner and outer conductors with a space between them wherein said material is heated by dielectric loss in the capacitive field associated with the conductors, said coaxial line and its associated capacitance being electrically equivalent to a short-circuited line which is an odd multiple of a quarter wavelength of the oscillations generated by the oscillator exciting said line, thus being equivalent to a resonant circuit, a multiplicity of small elements incorporated in said space in said coaxial line to cause the material to flow continuously in alternate fine films and pools to cause a uniform dispersion thereof, preliminary means for mixing said material prior to introducing it to said heater-disperser, and means for causing said material to flow through said preliminary means and said heater-disperser.

9. An apparatus for dispersing material comprising a feeding chamber into which the ingredients of a desired product are introduced to form a mass, a rotating feed screw for applying pressure to the mass within said feeding chamber to continuously force said mass in a desired direction, a plurality of concentrically positioned mixing plates provided with tapered peripheral grooves and staggered relative to each other and a strainer comprising a plurality of nested peripherally grooved concentric rings of decreasing diameter and disposed in the path of flow of said mass, to cause the latter to travel through a plurality of small tortuous attenuated paths and effect preliminary mixing of the ingredients throughout the mass; and a multiplicity of tightly packed small immobile spheres also disposed in the path of flow of the preliminarily mixed mass to cause the latter to pass continuously in fine films over the recurrent surfaces of said small spheres and into pools formed in the interstices therebetween with an ensuing pulsation and kneading-shearing of the ingredients of said mass to cause uniform dispersion thereof, said spheres being disposed in a short-circuited coaxial line having spaced apart inner and outer conductors, said line being excited by a high frequency oscillator and being electrically equal to a short-circuited line which is a quarter wavelength of the oscillations generated by said oscillator, said material being heated by dielectric loss in the capacitive field between the conductors of said coaxial line while being dispersed.

10. A dispersing head for dispersing apparatus comprising a short-circuited metallic coaxial line having inner and outer spaced apart conductors detachably connected to the remainder of said apparatus, said coaxial line being excited by a high frequency oscillator and being electrically equal to a short-circuited line which is a quarter wavelength of the oscillations of said oscillator and with its distributed capacitance and inductance being equivalent to a resonant circuit, and a multiplicity of small immobile dispersing elements tightly packed within the space between the conductors of said coaxial line.

11. A dispersing head for dispersing apparatus comprising an electrical conductive tube, an electrode disposed within said tube and spaced therefrom, electrical conductive means interconnecting one end of said electrode and one end of said tube, a source of high frequency potential, one of the output terminals of said potential source being connected to the other end of said electrode, and the other output terminal of said potential source being connected to the other end of said tube, the frequency of said potential source being such that the tube and electrode form a coaxial line which is electrically equal to a short-circuited line which is a quarter wavelength of the frequency of the potential source, the distributed capacitance and inductance of the tube and electrode being equivalent to a resonant circuit.

12. A dispersing head for dispersing apparatus comprising an electrical conductive tube, an electrode disposed within said tube and spaced therefrom, electrical conductive means interconnecting one end of said electrode and one end of said tube, a source of high frequency potential, one of the output terminals of said potential source being connected to the other end of said electrode, and the other output terminal of said potential source being connected to the other end of said tube, the frequency of said potential source being such that the tube and electrode form a coaxial line which is electrically equal to a short-circuited line which is a quarter wavelength of the frequency of the potential source, the distributed capacitance and inductance of the tube and electrode being equivalent to a resonant circuit, and a multiplicity of small immobile dispersing elements tightly packed within the space between said electrode and said tube.

13. A dispersing head for dispersing apparatus comprising an electrical conductive tube, an electrode disposed within said tube and spaced therefrom, electrical conductive means interconnecting one end of said electrode and one end of said tube, a source of high frequency potential, one of the output terminals of said potential source being connected to the other end of said electrode, and the other output terminal of said potential source being connected to the other end of said tube, the frequency of said potential source being such that the tube and electrode form a coaxial line which is electrically equal to a short-circuited line which is a quarter wavelength of the frequency of the potential source, the distributed capacitance and inductance of the tube and electrode being equivalent to a resonant circuit, said tube diverging toward the end thereof connected to said electrode whereby maximum heating is obtained at the smaller end of said tube adjacent the connection with the potential source.

14. A dispersing head for a dispersing apparatus comprising a tube formed of electrical conductive material, said tube having the ends thereof flared to form a throat section intermediate the ends, an electrode positioned within said tube and spaced therefrom, a strainer closing both ends of said tube, one of said strainers providing electrical connection between said electrode and said tube, a plurality of immobile dispersing elements tightly packed within the space between said electrode and said tube and confined by said strainers, the apertures in said strainers being smaller than said dispersing elements, and an oscillator, one of the output terminals of said oscillator being connected to said tube at the throat, the other output terminal of said oscillator being connected to said electrode at a point opposite the throat of said tube, the frequency of said oscillator being such that the tube and electrode form a coaxial line electrically equal to a short-circuited line which is a quarter wavelength of the frequency of said oscillator, the distributed capacitance and inductance of said tube and electrode being equivalent to a resonant circuit.

HENRY JENETT.
EUGENE MITTELMANN.

REFERENCES CITED

The following references are of record in the file of this patent:

UNITED STATES PATENTS

| Number | Name | Date |
|---|---|---|
| 1,234,490 | Bauer et al. | Dec. 9, 1919 |
| 1,483,742 | Nicol | Feb. 12, 1924 |
| 1,496,858 | Knollenberg | June 10, 1924 |
| 1,720,549 | Gilchrist | July 9, 1929 |
| 2,084,156 | Marsden | June 15, 1937 |
| 2,125,245 | McCray | July 26, 1938 |
| 2,132,854 | Knott | Oct. 11, 1938 |
| 2,163,898 | Van Der Lande | June 27, 1939 |
| 2,257,177 | Luster | Sept. 30, 1941 |
| 2,270,946 | Hopkins | Jan. 27, 1942 |
| 2,308,204 | Parry | Jan. 12, 1943 |
| 2,312,639 | Gronemeyer | Mar. 2, 1943 |
| 2,370,759 | Thompson | Mar. 6, 1945 |
| 2,370,883 | Smith | Mar. 6, 1945 |
| 2,416,124 | Siemens | Feb. 18, 1947 |

FOREIGN PATENTS

| Number | Country | Date |
|---|---|---|
| 592,105 | Germany | Feb. 1, 1934 |